United States Patent
Eschbach et al.

(10) Patent No.: US 6,392,764 B1
(45) Date of Patent: May 21, 2002

(54) SYSTEMS AND METHODS FOR ADAPTIVELY FILTERING PALETTIZED IMAGES

(75) Inventors: Reiner Eschbach, Webster; Fritz F. Ebner, Rochester; Tse-Kee Chan, Penfield, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/189,931

(22) Filed: Nov. 12, 1998

(51) Int. Cl.$^7$ .................................. G03F 3/08
(52) U.S. Cl. ................. 358/522; 382/168; 382/162
(58) Field of Search ................... 358/522, 447, 358/448, 1.9; 382/260, 108, 162, 172, 165, 166, 168

(56) References Cited

U.S. PATENT DOCUMENTS

| | | | |
|---|---|---|---|
| 4,636,845 A | * 1/1987 | Alkofer | 358/80 |
| 4,639,769 A | * 1/1987 | Fleisher et al. | 358/27 |
| 4,729,016 A | * 3/1988 | Alkofer | 358/80 |
| 4,745,465 A | * 5/1988 | Kwon | 358/80 |
| 5,012,333 A | * 4/1991 | Lee et al. | 358/80 |
| 5,047,842 A | * 9/1991 | Bouman, Jr. et al. | 358/75 |
| 5,081,691 A | * 1/1992 | Chesley | 382/54 |
| 5,218,649 A | * 6/1993 | Kundu et al. | 382/54 |
| 5,379,122 A | * 1/1995 | Eschbach | |
| 5,414,538 A | * 5/1995 | Eschbach | 358/522 |
| 5,446,504 A | * 8/1995 | Wada | 348/645 |
| 5,450,502 A | * 9/1995 | Eschbach et al. | 382/169 |
| 5,544,258 A | * 8/1996 | Levien | 382/169 |
| 5,717,791 A | * 2/1998 | Labaere et al. | 382/274 |
| 5,774,599 A | * 6/1998 | Muka et al. | 382/254 |
| 5,802,214 A | * 9/1998 | Eschbach et al. | 382/254 |
| 5,808,697 A | * 9/1998 | Fujimura et al. | 348/672 |
| 5,959,696 A | * 9/1999 | Hwang | 348/678 |
| 5,978,518 A | * 11/1999 | Oliyide et al. | 382/260 |
| 6,148,103 A | * 11/2000 | Nenonen | 382/169 |
| 6,205,257 B1 | * 3/2001 | Eschbach | 382/261 |
| 6,222,642 B1 | * 4/2001 | Farrell et al. | 358/1.9 |

OTHER PUBLICATIONS

I. Pitas et al., Nonlinear Digital Filters, Kluwer Academic Publishers, 1990, pp. 131–134.*

Barry Haynes and Webdy Crumpler, Photoshop 5 Artistry, New Riders Publishing, Sep. 1998, pp. 242–243, pp. 126–127, p. 66.*

* cited by examiner

*Primary Examiner*—Edward Coles
*Assistant Examiner*—Tia A. Carter
(74) *Attorney, Agent, or Firm*—Oliff & Berridge, PLC

(57) ABSTRACT

Palletized image enhancement systems and methods enhance palletized images by σ-filtering the palletized image. Palletized images, such as GIF images, are analyzed to obtain a number of σ filter parameters based on the global image features of the palletized image. Local portions of the image data are analyzed to determine which of the σ filter parameters should be used for each particular portion. The σ filter parameters are determined based on histograms of the color palette of the palletized image data. As a result, a good balance between color re-creation and image sharpness in the enhanced palletized image is obtained.

28 Claims, 14 Drawing Sheets

COLOR SEPARATION LAYER COLOR VALUES

| Range | | | | | | | | | | | | | | | | |
|---|---|---|---|---|---|---|---|---|---|---|---|---|---|---|---|---|
| 0-15    | 1 | 0 | 0 | 0 | 1 | 0 | 1 | 0 | 0 | 1 | 1 | 0 | 0 | 0 | 0 | 0 |
| 16-31   | 1 | 0 | 0 | 0 | 0 | 1 | 0 | 0 | 1 | 1 | 1 | 1 | 1 | 1 | 1 | 0 |
| 32-47   | 0 | 1 | 1 | 1 | 1 | 1 | 1 | 1 | 0 | 1 | 1 | 0 | 1 | 0 | 1 | 1 |
| 48-63   | 0 | 1 | 1 | 1 | 0 | 1 | 0 | 0 | 0 | 1 | 1 | 1 | 1 | 0 | 1 | 0 |
| 64-79   | 1 | 0 | 1 | 1 | 0 | 0 | 0 | 1 | 1 | 0 | 0 | 0 | 0 | 1 | 1 | 1 |
| 80-95   | 1 | 1 | 1 | 0 | 1 | 1 | 1 | 0 | 0 | 1 | 1 | 0 | 1 | 1 | 1 | 0 |
| 96-111  | 1 | 1 | 0 | 1 | 0 | 1 | 1 | 1 | 0 | 1 | 0 | 0 | 1 | 1 | 0 | 1 |
| 112-127 | 0 | 0 | 1 | 0 | 1 | 1 | 1 | 1 | 1 | 0 | 1 | 1 | 0 | 0 | 0 | 1 |
| 128-143 | 1 | 1 | 0 | 0 | 0 | 1 | 0 | 1 | 1 | 0 | 0 | 0 | 0 | 1 | 0 | 0 |
| 144-159 | 1 | 1 | 1 | 0 | 1 | 1 | 0 | 1 | 0 | 1 | 1 | 1 | 0 | 0 | 0 | 1 |
| 160-175 | 1 | 0 | 0 | 1 | 0 | 0 | 0 | 1 | 0 | 0 | 0 | 1 | 0 | 0 | 1 | 0 |
| 176-191 | 0 | 1 | 0 | 0 | 0 | 1 | 0 | 1 | 0 | 0 | 1 | 0 | 0 | 0 | 0 | 0 |
| 192-207 | 1 | 0 | 0 | 0 | 1 | 0 | 0 | 1 | 0 | 0 | 1 | 0 | 0 | 0 | 0 | 0 |
| 208-223 | 0 | 0 | 0 | 0 | 0 | 0 | 0 | 1 | 0 | 0 | 0 | 0 | 0 | 0 | 0 | 0 |
| 224-239 | 0 | 0 | 0 | 0 | 0 | 0 | 0 | 0 | 0 | 0 | 0 | 0 | 0 | 0 | 0 | 0 |
| 240-255 | 0 | 0 | 0 | 0 | 0 | 0 | 1 | 1 | 0 | 0 | 0 | 0 | 1 | 0 | 0 | 1 |

NUMBER OF OCCURRENCES OF COLOR VALUE IN PALETTE

FIG. 9

| SEPARATION DISTANCE BETWEEN CONSECUTIVE NON-ZERO VALUES IN COLOR VALUE HISTOGRAM | NUMBER OF OCCURRENCES OF SEPARATION DISTANCE IN HISTOGRAM OF PALETTE COLOR VALUES |||||||||||||||| 
|---|---|---|---|---|---|---|---|---|---|---|---|---|---|---|---|
| 0-15    | 1 | 60 | 21 | 10 | 7 | 3 | 1 | 1 | 0 | 0 | 0 | 1 | 1 | 0 | 0 | 0 |
| 16-31   | 0 | 0  | 0  | 0  | 0 | 0 | 0 | 0 | 0 | 0 | 0 | 0 | 0 | 0 | 0 | 0 |
| 32-47   | 0 | 0  | 0  | 0  | 0 | 0 | 0 | 0 | 0 | 0 | 0 | 0 | 0 | 0 | 0 | 0 |
| 48-63   | 0 | 0  | 0  | 0  | 0 | 0 | 0 | 0 | 0 | 0 | 0 | 0 | 0 | 0 | 0 | 0 |
| 64-79   | 0 | 0  | 0  | 0  | 0 | 0 | 0 | 0 | 0 | 0 | 0 | 0 | 0 | 0 | 0 | 0 |
| 80-95   | 0 | 0  | 0  | 0  | 0 | 0 | 0 | 0 | 0 | 0 | 0 | 0 | 0 | 0 | 0 | 0 |
| 96-111  | 0 | 0  | 0  | 0  | 0 | 0 | 0 | 0 | 0 | 0 | 0 | 0 | 0 | 0 | 0 | 0 |
| 112-127 | 0 | 0  | 0  | 0  | 0 | 0 | 0 | 0 | 0 | 0 | 0 | 0 | 0 | 0 | 0 | 0 |
| 128-143 | 0 | 0  | 0  | 0  | 0 | 0 | 0 | 0 | 0 | 0 | 0 | 0 | 0 | 0 | 0 | 0 |
| 144-159 | 0 | 0  | 0  | 0  | 0 | 0 | 0 | 0 | 0 | 0 | 0 | 0 | 0 | 0 | 0 | 0 |
| 160-175 | 0 | 0  | 0  | 0  | 0 | 0 | 0 | 0 | 0 | 0 | 0 | 0 | 0 | 0 | 0 | 0 |
| 176-191 | 0 | 0  | 0  | 0  | 0 | 0 | 0 | 0 | 0 | 0 | 0 | 0 | 0 | 0 | 0 | 0 |
| 192-207 | 0 | 0  | 0  | 0  | 0 | 0 | 0 | 0 | 0 | 0 | 0 | 0 | 0 | 0 | 0 | 0 |
| 208-223 | 0 | 0  | 0  | 0  | 0 | 0 | 0 | 0 | 0 | 0 | 0 | 0 | 0 | 0 | 0 | 0 |
| 224-239 | 0 | 0  | 0  | 0  | 0 | 0 | 0 | 0 | 0 | 0 | 0 | 0 | 0 | 0 | 0 | 0 |
| 240-255 | 0 | 0  | 0  | 0  | 0 | 0 | 0 | 0 | 0 | 0 | 0 | 0 | 0 | 0 | 0 | 0 |

FIG. 10

| 221 | 221 | | | | | | |
|---|---|---|---|---|---|---|---|
| 221 | 221 | 89 | 34 | 34 | | | |
| 221 | 229 | 89 | 34 | 34 | 45 | 45 | 51 |
| 226 | 229 | 89 | 56 | 39 | 39 | 39 | 45 |
| 226 | 229 | 81 | 42 | 39 | 45 | 45 | 45 |
| 226 | 221 | 76 | 51 | 34 | 39 | 39 | 45 |
| 215 | 212 | 51 | 44 | 39 | 45 | 45 | 56 |
| 229 | 178 | 42 | 39 | 39 | 45 | 45 | 56 |
| | | 43 | 39 | | 51 | 56 | 68 |
| | | | | | | 68 | 79 |

FIG. 13

```
for entire image
    {
    calculate histogram (r,g,b,)
for each histogram
    }
    calculate histogram of differences HOD(Δr, Δg, Δb)
    }
REM weighted difference
sigma_common(r,g,b) = max(max(Δr x HOD(Δr)), max(Δg x HOD(Δg)), max( Δb x
HOD(Δb)))

if ( sigma_common < sigma_common_default ) sigma_common =
sigma_common_default

REM maximum difference
sigma_max (r,g,b) = max(max(HOD(Δr)≠ 0), max(HOD(Δg)≠ 0), max(HOD(Δb)≠ 0))

if (sigma_max < sigma_max_default ) sigma_max = sigma_max_default

REM start processing of image
for entire image
    {
    create 3x3 neighborhood
    if ( dynamic range of neighborhood ≤ sigma_max )
            filter with sigma_max
else
            filter with sigma_common
    if( 2 separations ≤ sigma_common ) also filter 3$^{rd}$ separation
    }
```

FIG. 14

SYSTEMS AND METHODS FOR ADAPTIVELY FILTERING PALETTIZED IMAGES

BACKGROUND OF THE INVENTION

1. Field of Invention

This invention relates to image processing. More particularly, this invention is directed to systems and methods for enhancing the color appearance of color-palletized images.

2. Description of Related Art

A large amount of image data found on the World Wide Web and other image data sources uses a palletized image format to reduce the size of the stored image data. One common image format on the World Wide Web is the Graphics Interchange Format (GIF) standard, which incorporates an algorithm that reduces a full color; e.g., a 24-bit, color image to an 8-bit palletized color image. When displayed using the colors available in the palette on a display screen, such as a CRT, palletized images have acceptable quality.

However, when the same images are printed on a color printer, such as a full-color xerographic printer or digital copier, an ink jet printer or a dye sublimation printer, the underlying degradation caused by converting the full-color image data to palletized image data becomes visible and often unacceptable. This degradation is caused by at least two different mechanisms: 1) compared to images on computer monitors, printed images are presented in a larger image size having considerably more pixels in the image; and 2) converting the original full-color image data to palletized image data is an inherently lossy process.

SUMMARY OF THE INVENTION

The images printed from such palletized image data generally suffer from severe artifacts caused by palletizing the original full-color image data. Thus, when printing palletized image data, a plausible full-color representation of the original image data needs to be created from the palletized image data to create a printout that will be acceptable to the end-user.

There are a great number of image filtering techniques known in the art. One such filtering technique is the $\sigma$-filtering technique, disclosed in U.S. Pat. No. 5,379,122 to Eschbach, herein incorporated by reference in its entirety. As disclosed in the 122 patent, $\sigma$-filtering smoothes image data with minimal deterioration of the image sharpness in the resulting image. It should be understood that the term $\sigma$-filtering, as used herein, refers more generally to the general group of trimmed filters, such as, for example, the trimmed filters described in *Nonlinear Digital Filters*, I. Pitas and A. N. Venetsanopoulos, Kluwer Academic Publishing, 1990.

According to the systems and methods of this invention, this reasonable "printable" color image is generated by forming a filtered representation of the palletized image data that has an enhanced color appearance.

However, $\sigma$-filtering conventionally requires adjusting the filter parameters, particularly the value of the variable $\sigma$, for each image. Typically, this adjustment is done manually. However, manually adjusting the filter parameters, such as $\sigma$, is time consuming and prone to error. Moreover, manually adjusting the filter parameters using a trial and error approach is usually done iteratively with repeated manual settings. Alternately, the filter parameters can be fixed to avoid this manual adjustment. However, using such fixed filter parameters results in less than optimal filtered images.

This invention thus provides systems and methods for enhancing the color appearance of a palletized image.

This invention separately provides systems and methods for filtering palletized image data to enhance the color appearance of the palletized image.

This invention separately provides systems and methods for an adaptive $\sigma$-filtering process.

This invention separately provides systems and methods for adaptive -$\sigma$filtering that obtains one or more $\sigma$-filter parameters from the actual image data.

This invention separately provides systems and methods for globally determining one or more $\sigma$ parameters by globally analyzing the actual image data.

This invention separately provides systems and methods for modifying the one or more $\sigma$ parameters on a local basis as a function of local image data.

This invention separately provides systems and methods for globally determining one or more $\sigma$ parameters by analyzing an image palette.

This invention separately provides systems and methods which enhances the color appearance of a palletized image by adaptive $\sigma$-filtering using a $\sigma$ parameter obtained globally from either the actual image data or a corresponding image palette and which locally modifies the $\sigma$ parameter based on local image data.

According to one exemplary embodiment of the systems and methods according to this invention, global $\sigma$ parameters, which provide a good estimate of the noise in the palletized image, are determined from the palletized image data. The global $\sigma$-parameters are then locally modified, during the filtering process, for each individual pixel, based on the dynamic range of the $\sigma$-filter block centered on the individual pixel. In particular, when the filtering is performed on a color separation basis, the data in one color separation layer can be used to modify the local filter settings in another color separation layer. For example, if two or more of the color separation layers for each individual pixel are within the global $\sigma$-filter, the third color separation layer for that pixel might be filtered, even if it is not within the global $\sigma$ parameter. Additionally, if the dynamic range of the block of pixels surrounding each individual pixel is within the $\sigma$ parameter, such that there is no reliable edge or high frequency detail information within the block, the $\sigma$ parameter is modified to result in stronger smoothing.

According to another exemplary embodiment of the systems and methods of this invention, the global $\sigma$ parameters are determined by examining the color palette of the image only, without needing to examine the entire image content.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein:

FIG. 9 is an exemplary color value histogram for an exemplary color separation layer of an image according to this invention;

FIG. 10 is an exemplary difference histogram generated from the color value histogram shown in FIG. 9;

FIG. 13 shows the exemplary portion of the color separation layer shown in FIG. 11 filtered according to this invention; and FIG. 14 shows an exemplary pseudo-code listing implementing one embodiment of the method for enhancing palletized images according to this invention.

DETAILED DESCRIPTION OF PREFERRED EMBODIMENTS

Figure 1:
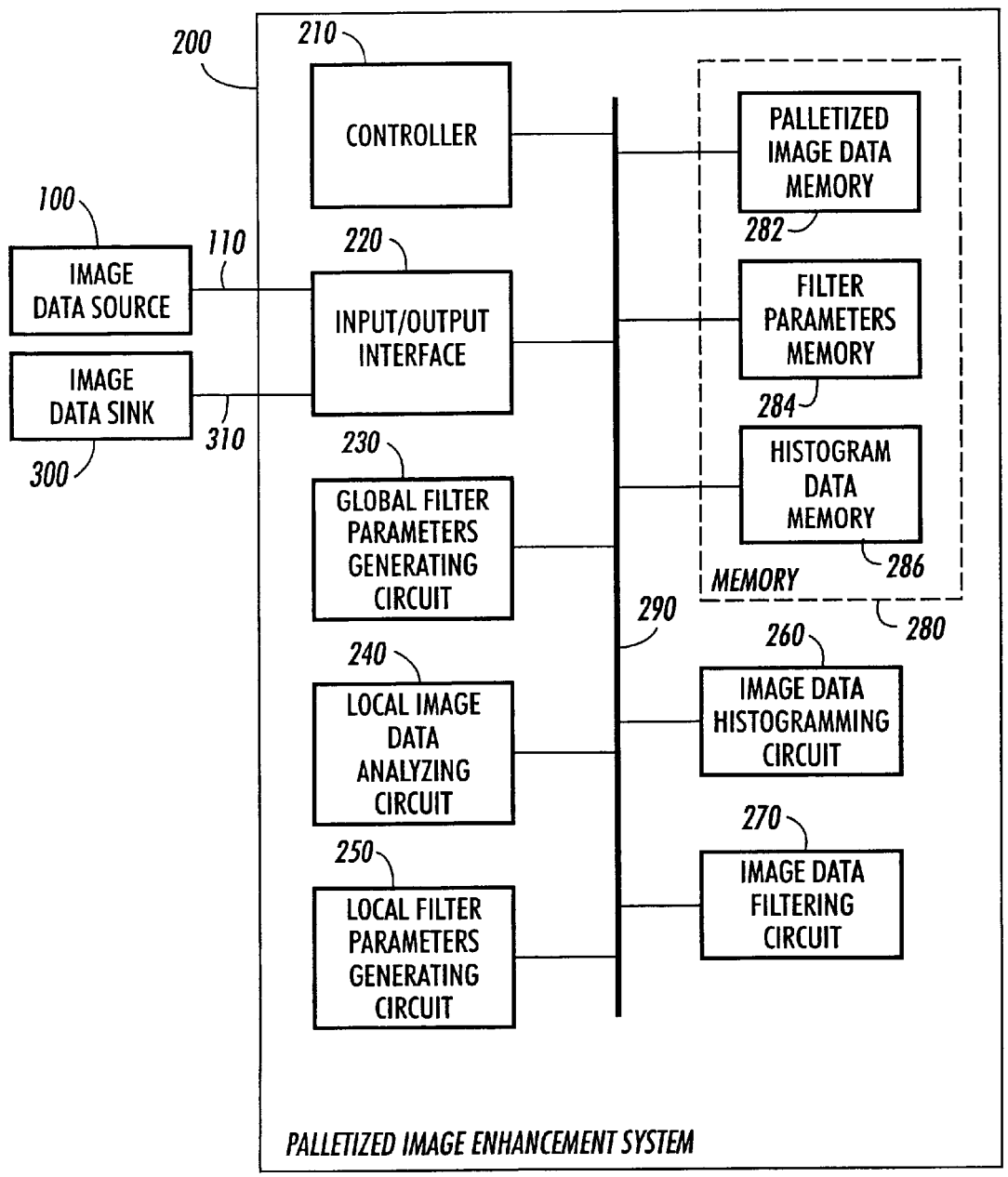
FIG. 1 is a functional block diagram of one exemplary embodiment of palletized image enhancement system according to this invention.

FIG. 1 shows one exemplary embodiment of a generalized functional block diagram of a palletized image enhancement system 200 according to this invention. The palletized image enhancement system 200 is connected to an image data source 100, over a signal line or link 110, that provides palletized image data and to an image data sink 300, over a signal line or link 310, that receives the enhanced images output by the palletized image enhancement system 200. In general, the image data source 100 can be any one of a number of different sources, such as a scanner, a digital copier, a facsimile device that is suitable for generating electronic image data, or a device suitable for storing and/or transmitting electronic image data, such as a client or server of a network, or the Internet, and especially the World Wide Web.

Thus, the image data source 100 can be any known or later developed source that is capable of providing palletized image data to the palletized image enhancement system 200 of this invention. Similarly, the image data sink 300 can be any known or later developed device that is capable of receiving the enhanced image data output by the palletized image enhancement system 200 and either storing, transmitting, or displaying that enhanced image data. Thus, the image data sink 300 can be either or both of a channel device for transmitting the enhanced image data for display or storage or a storage device for indefinitely storing the enhanced image data until there arises a need to display or further transmit the enhanced image data.

The channel device can be any known structure or apparatus for transmitting the enhanced image data from the palletized image enhancement system 200 to a physically remote storage or display device. Thus, the channel device can be a public switched telephone network, a local or wide area network, an intranet, the Internet, a wireless transmission channel, any other distributing network, or the like. Similarly, the storage device can be any known structural apparatus for indefinitely storing the enhanced image data, such as a RAM, a hard drive and disk, a floppy drive and disk, an optical drive and disk, a flash memory or the like.

Moreover, the palletized image enhancement system 200 can be implemented as software executing on a programmed general purpose computer, a special purpose computer, a microprocessor or the like. In this case, the palletized image enhancement system 200 can be implemented as a routine embedded in a printer driver, as a resource residing on a server, or the like. The palletized image enhancement system 200 can also be implemented by physically incorporating it into a software and/or hardware system, such as the hardware and software systems of a printer or a digital photocopier.

As shown in FIG. 1, the palletized image enhancement system 200 includes a controller 210, an input output interface 220, a global filter parameter generating circuit 230, a local image data analyzing circuit 240, a local filter parameters modifying circuit 250, an image data histogramming circuit 260, an image data filtering circuit 270, and a memory 280, each of which is connected to a data bus 290. The input output interface 220 is also connectable to the image data source 100 and the image data sink 300 over the signed lines or links 110 and 310, respectively.

As shown in FIG. 1, the memory 280 includes a palletized image data memory 282, a filter parameters memory 284 and a histogram data memory 286. The palletized image data memory 282 stores the palletized image data received from the image data source 100 through the input output interface 220. It should be appreciated that palletized image data memory 282 can store all of the palletized image data or only a portion of the palletized image data. In particular, in the exemplary embodiments outlined below, only a portion of the palletized image data is stored at any time. The filter parameters memory 284 stores the filter parameters for a particular image stored in the palletized image data memory 282 that were generated by the global filter parameter generating circuit 230. The histogram data memory 286 stores histogram data generated by the image data histogramming circuit 260 from the palletized image data stored in the palletized image data memory 282.

The memory 280 also stores any necessary control programs and/or data required by the palletized image enhancement system 200. Thus, the memory 280 can be implemented using static or dynamic RAM, a floppy disk and disk drive, a writeable optical disk and disk drive, a hard disk and disk drive, flash memory, or the like. The memory 280 can also include read only memory, including PROMs, EPROMs, EEPROMs, a CD-ROM and disk drive, or the like.

Figure 2:
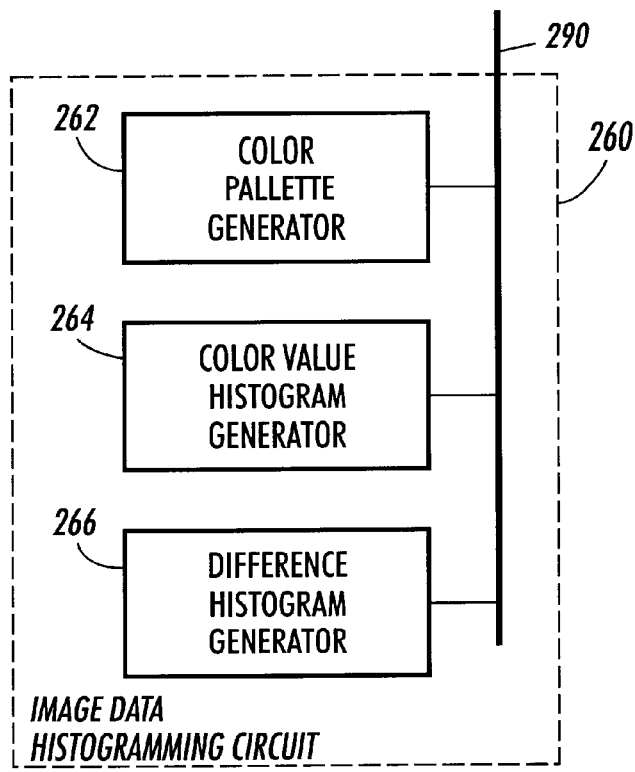
FIG. 2 is a functional block diagram showing one exemplary embodiment of the image data histogramming circuit of FIG. 1 in greater detail.

FIG. 2 is a functional block diagram showing in greater detail one exemplary embodiment of the image data histogramming circuit 260. As shown in FIG. 2, the image data histogramming circuit 260 includes a color palette generator 262, a color value histogram generator 264 and a difference histogram generator 266, each connected to the data and control bus 290. It should be appreciated that in systems that will only, or usually, receive palletized input image data that already contains the color palette, the color palette generator 262 may be omitted. However, in this case, the palletized image enhancement system 200 will not be able to process the image data when the image data does not contain the color palette.

Figure 3:
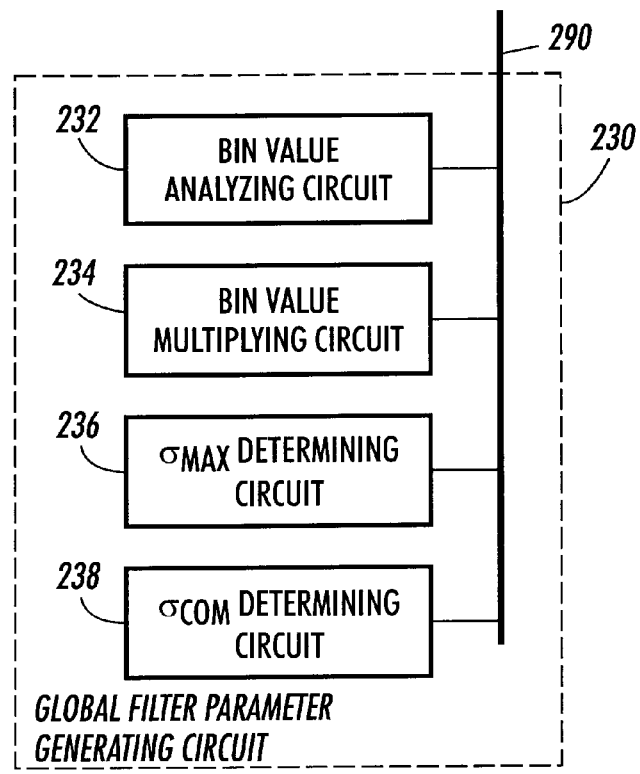
FIG. 3 is a functional block diagram showing one exemplary embodiment of the global filter parameter generating circuit of FIG. 1 in greater detail.

FIG. 3 is a functional block diagram showing in greater detail one exemplary embodiment of the global filter parameter generating circuit 230 of FIG. 1. As shown in FIG. 3, the global filter parameter generating circuit 230 includes a bin value analyzing circuit 232, a bin value weighting circuit 234, a $\sigma_{MAX}$ determining circuit 236 and a $\sigma_{COM}$ determining circuit 238.

The image data histogramming circuit 260 receives the palletized image data from the palletized image data memory and generates a color value histogram and a difference histogram for each color separation layer in the color palette defining the colors appearing in the palletized image stored in the palletized image data memory 282. Based on the histograms generated by the image data histogramming circuit 260, the global filter parameter generating circuit 230 generates a number of different filter parameters representative of the entire palletized image stored in the palletized image data memory 282.

To enhance a palletized image stored in the palletized image data memory 282, the local image data analyzing circuit 240 selects a current pixel of the palletized image data and a number of neighboring pixels that are within a predefined neighborhood around the selected current pixel. The local image data analyzing circuit 240 determines a dynamic range for each of the color separation layers for the current pixel. In particular, the local image data analyzing circuit 240 can determine a single dynamic range for the current pixel. Alternatively, the local image data analyzing circuit 240 can separately determine an "up" dynamic range and a "down" dynamic range for the current pixel. The single dynamic range is the largest absolute difference between the image value of the current pixel and the largest or smallest image value of the neighboring pixels in the neighborhood around the current pixel. In contrast, "up" dynamic range is the absolute difference between the image value of the current pixel and the largest image value of the pixels in the predefined neighborhood around the current pixel. Similarly, the "down" dynamic range is the absolute difference between the image value of the current pixel and the smallest image value of the pixels in the predefined neighborhood around the current pixel.

Based on the one or more dynamic ranges of the color separation layers determined for the current pixel by the local image data analyzing in circuit 240, the local filter parameter modifying circuit 250 selects, for each color separation layer, a particular one of the filter parameters generated by the global filter parameter generating circuit 230 to appropriately filter the current pixel. Then, based on the local filter parameters selected by the local filter parameter modifying circuit 250, the image data filtering circuit 270 filters the current pixel based on the image data for the current and neighboring pixels identified by the local image data analyzing circuit 240. The filtered image data output by the image data filtering circuit 270 can then either be stored in an enhanced image data portion of the memory 280 or can be immediately output through the input output interface 220 to the image data sink 300.

In particular, when the image data histogramming circuit 260 generates histograms from the palletized image data stored in the palletized image data memory 280, the color palette generator 262 first determines if the palletized image data stored in the palletized image data memory 282 includes an explicitly defined color palette. If the palletized image data stored in the palletized image data memory 282 does not include an explicitly defined color palette, the color palette generator 262 analyzes the palletized image data to generate the color palette. Then, the color value histogram generator 264 selects, in turn, each of the colors of the generated or explicitly defined color palette and modifies or updates each one of the color value histograms corresponding to each one of the color separation layers based on the selected color from the color palette. It should be appreciated that the color value histogram generator 264, when creating a color value histogram indicative of the colors in the palletized image, does not need to store the information of the frequency of the colors, although it may do so. Such a color value histogram can easily obtained by the color value histogram generator 264 from an explicitly defined color palette, but can also be derived by the color value histogram generator 264 from the actual image data.

Next, the difference histogram generator 266 analyzes each of the color value histograms for each of the color separation layers generated by the color value histogram generator 264. The difference histogram generator 266 generates, for each color value histogram, a difference histogram. The difference histogram indicates the distribution of non-zero color values in the color value histogram. The difference histogram indicates the sizes of the gaps between non-zero color values in the color value histogram.

The bin value analyzing circuit 232 of the global filter primary generating circuit 230 receives the difference histogram generated by the difference histogram generator 266. The bin value analyzing circuit 232 first locates the highest non-zero value in the difference histograms for the plurality of color separation layers generated by the difference histogram generator 266. This largest value, $\sigma_{MAX}$, indicates the largest gap between two non-zero color values in the palette. Then, the bin value weighting circuit 234 weights each of the non-zero difference values in the difference histogram by a function of occurrences for each such value. The bin value weighting circuit 234 then selects the largest resulting weighted value and identifies the difference value that generated the largest weighted value.

It should be appreciated that, to weight the non-zero difference values, the bin value weighting circuit 234 can simply multiply each value in the difference histogram by its bin number, or, more generally, use the first-order moments of the non-zero values of the difference histogram. However, the bin value weighting circuit 234 can use any other known or later developed weighting scheme.

The $\sigma_{MAX}$ determining circuit 236 determines if the highest non-zero difference value identified by the bin value analyzing circuit 232 is greater than a largest-difference default value for the largest difference. If so, the $\sigma_{MAX}$ determining circuit 236 sets the filter parameter $\sigma_{MAX}$ to the largest non-zero difference. Otherwise, the $\sigma_{MAX}$ determining circuit 236 sets the filter parameter $\sigma_{MAX}$ to the largest-difference default value. It should be appreciated that the largest weighted value of the difference histogram can optionally be determined individually for each color separation layer, resulting in, for example, $\sigma_{MAX,R}$, $\sigma_{MAX,G}$, $\sigma_{MAX,B}$, when the image data is in a red-green-blue color space.

The $\sigma_{COM}$ determining circuit 238 then determines if the difference value identified by the bin value weighting circuit 234 is, greater than a common default value. If so, the $\sigma_{COM}$ determining circuit 238 sets the filter parameter $\sigma_{COM}$ to the difference value identified by the bin value weighting circuit 234. Otherwise, the $\sigma_{COM}$ determining circuit 238 sets the filter parameter $\sigma_{COM}$ to the common default value. It should be appreciated that the $\sigma_{COM}$ value of the difference histogram can optionally be determined individually for each color separation layer, resulting in $\sigma_{COM,R}$, $\sigma_{COM,G}$, $\sigma_{COM,B}$, when the image data is in a red-green-blue color space.

In operation, when a palletized image is to be enhanced, the palletized image enhancement system 200 inputs palletized image data over the signal line or link 110 from the image data source 100. The palletized image data is received through the input output interface 200 and stored in the palletized data memory 282 of the memory 280 under control of the controller 210. If the palletized image data stored in the palletized image data memory 282 includes an explicitly defined palette, the image data histogramming circuit 260, under control of the controller 210, can begin analyzing the explicitly defined palette as soon as the palletized image enhancement system 200 begins receiving the palette data. It should be appreciated that the image data histogramming circuit 260 will not be able to complete its processing until all of the palette data has been received by the palletized image enhancement system 200. It should also be appreciated that, when the image data contains an explicitly defined palette, processing can commence on the image data as soon as the color palette information is received, enabling stream-oriented processing.

Alternatively, if the palletized image data does not include an explicitly defined color palette, the color palette generator 262 of the image data histogramming circuit 260, under control of the controller 210, will begin analyzing the actual image data as it is received. Again, it should be appreciated that the color palette generator 262 will not be able to complete its analysis until all of the palletized image data has been received.

Once the color palette for the palletized image data is available, the color value histogram generator 264, under control of the controller 210, inputs in turn each of the entries in the color palette. As each entry in the color palette is selected, the color value histogram generator 264 divides the color defined by that entry of the color palette into its constituent color separation layers. In particular, for red-green-blue color-space images, the color value histogram generator 264 divides each entry in the color palette into the constituent red, green and blue color separation layers. If the colors in the color palette are defined in L-a-b, or L-u-v, color-space, the color value histogram generator 264 will divide the color defined in each entry of the color palette into the constituent L, a and b, or L, u and v, color separation layers. If the colors in the color palette are in a cyan-magenta-yellow or a cyan-magenta-yellow-black color-space, the color value histogram generator 264 will divide the color defined in each color palette entry into the constituent cyan, magenta and yellow, or cyan, magenta, yellow and black color separation layers.

Regardless of the particular color separation layers generated by the color value histogram generator 264, the color value histogram generator 264 will, for each entry in the color palette and each color separation layer, increment the bin corresponding to a particular color value in a particular color separation layer whenever that value for that color separation layer appears in the color palette. For simplification, as mentioned above, the color value histogram might store a value that indicates only that a certain color occurred in the color pallets, without counting the number of occurrences of each occurring color.

Once the color value histogram generator 264 has generated the color value histograms for each of the color separation layers defining the colors in the color palette, the difference histogram generator 266, under control of the controller 210, determines a difference histogram for each color separation layer generated by the color value histogram generator. Each difference histogram indicates, for the corresponding color value histogram, how the color values are distributed in that color value histogram. In particular, each difference histogram increments a bin corresponding to the number of bins that must be checked after a non-zero bin to find the next non-zero bin.

For example, if the 0-value bin for a particular color value histogram is non-zero, the 0-bin of the difference generator will be incremented by one. Then, if the next non-zero bin in the color value histogram is the 1-bin, that bin is one away from the previous non-zero bin, the 0-bin. Accordingly, the 1-bin in the difference histogram is incremented by one. Similarly, if the next non-zero bin in the color value histogram is the 3-bin, the distance from the 3-bin from the 1-bin is two. Accordingly, the 2-bin of the difference generator is incremented by one.

Once the color value histograms are generated by the histogram generator 264 generated, they are stored in the histogram data memory 286. Similarly, once the difference histograms are generated by the difference histogram generator 266, they are also stored in the histogram data memory 286.

Once the difference histograms for each of the color separation layers are generated by the difference histogram generator 266, the global filter parameter generating circuit 230, under control of the controller 210, begins analyzing the generated difference histograms. In particular, the bin value analyzing circuit 232, under control of the controller 210, inputs in turn each of the difference histograms for each of the color separation layers. The bin value analyzing circuit 232 then identifies the largest non-zero valued bin in the first difference histogram. The bin value analyzing circuit 232 then identifies the largest non-zero-valued bin in the second difference histogram and determines whether that bin has a larger bin number than the identified bin of the first difference histogram. If so, that bin of the second histogram is selected as the largest bin. This continues until each of the color separation layers have been analyzed.

The $\sigma_{MAX}$ determining circuit 236, under control of the controller 210, then receives the bin number having the largest non-zero-value of the difference histograms for all of the color separation layers from the bin value analyzing circuit 232. The $\sigma_{MAX}$ determining circuit 236 then determines whether the value for the $\sigma_{MAX}$ filter parameter, which is based on the number of the bin determined to have the largest non-zero value, is greater than a default value $\sigma_{DMAX}$. If so, the $\sigma_{MAX}$ determining circuit 236 outputs the determined value from the difference histogram as the $\sigma_{MAX}$ filter parameter. Otherwise, the $\sigma_{MAX}$ determining circuit 236 outputs the default value $\sigma_{DMAX}$ as the $\sigma_{MAX}$ filter parameter.

Then, the bin value weighting circuit 234 receives each of the difference histograms in turn. For each difference histogram, the bin value weighting circuit 234 weights the value of a particular bin and the difference value represented by that bin. As each non-zero weighted value is generated, the bin value weighting circuit 234 determines if that weighted value is greater than a current largest weighted value. If so, the bin value weighting circuit stores that weighted value as the largest weighted value and identifies the bin number corresponding to that largest weighted value. The bin value weighting circuit 234 then analyzes all of the other difference histograms to identify the difference value bin having the largest weighted value.

The $\sigma_{COM}$ determining circuit 238, under control of the controller 210, then inputs this weighted value from the bin value weighting circuit 234. The $\sigma_{COM}$ determining circuit 238 then determines whether the value for the $\sigma_{COM}$ filter parameter, which is based on the determined bin that results in the largest weighted value, is greater than a default value $\sigma_{DCOM}$. If so, the $\sigma_{COM}$ determining circuit 238 outputs the determined value from the difference histogram as the $\sigma_{COM}$ filter parameter. Otherwise, the $\sigma_{COM}$ determining circuit 238 outputs the default value $\sigma_{DCOM}$ as the $\sigma_{COM}$ filter parameter. It should also be appreciated that, as a result of these definitions of $\sigma_{MAX}$ and $\sigma_{COM}$, $\sigma_{MAX}$ will always be greater than $\sigma_{COM}$.

Once the global filter parameter generating circuit 230 has determined the values for the filter parameters $\sigma_{MAX}$ and $\sigma_{COM}$, either by analyzing the explicitly contained color palette or by globally analyzing the palletized image, the local image analyzing circuit 240, under control of the controller 210, receives each pixel of the palletized image in order. For each pixel, the local image analyzing circuit 240 defines a neighborhood of pixels that are adjacent to and/or near the current pixel. The local image data analyzing circuit 240 then determines a dynamic range of each color separation layer for the pixels forming the neighborhood around the selected pixel. As described above, this dynamic range is defined, for each color separation layer, by the maximum absolute difference between the image value of the current pixel and the image value of any image value of a pixel in the predefined neighborhood.

Alternatively, as described above, both "down" and "up" dynamic ranges can be defined. In particular, as described above, the "down" dynamic range is the absolute difference between the image value of the current pixel and the lowest image value of the pixels in the predefined neighborhood. The "up" dynamic range is the absolute difference between the image value of the current pixel and the highest image value of the pixels in the predefined neighborhood. Determining both "down" and "up" dynamic ranges is advantageous because it better preserves edge information.

If, for each color separation layer, both the minimum and maximum image values of the pixels in the neighborhood are within the value determined for the filter parameter $\sigma_{MAX}$, of the image value of the current pixel, the local image data analyzing circuit 240 determines that that pixel does not represent any edge information. Accordingly, the local filter parameter modifying circuit 250, under control of the controller 210, indicates to the image data filtering circuit 270 that that pixel should be filtered using the $\sigma_{MAX}$ filter parameter rather than the $\sigma_{COM}$ filter parameter. As set forth above, it should be appreciated that the decision to use either the $\sigma_{MAX}$ or the $\sigma_{COM}$ filter parameters can be done on a color separation layer-by-color separation layer basis.

At the same time, the local image data analyzing circuit 240, under control of the controller 210, determines whether two or more of the color separation layers for the current pixel that are within $\sigma_{MAX}$ of the image value of the current pixel. That is, the local image data analyzing circuit 240 checks to see if the dynamic ranges of two of the color separation layers of the current pixel are within $\sigma_{MAX}$ of the image value of the current pixel. If the dynamic ranges of two or more of the color separation layers are within $\sigma_{MAX}$ of the current pixel, the other separation layers should be filtered, even if they are outside that bound. Thus, the local image data analyzing circuit 240 also outputs a signal to the image data filtering circuit 270 indicating which of the color separation layers are to be filtered.

It should be appreciated that determining to filter a color separation layer can be further determined based on aspects of the predefined neighborhood, such as, for example, the local structure of the image values in that neighborhood.

If the dynamic range for the current pixel does exceed $\sigma_{MAX}$, thus indicating an edge, the filtering will be performed using $\sigma_{COM}$ as the filter parameter.

It should also be appreciated that, by applying the $\sigma_{COM}$ and $\sigma_{MAX}$ filter parameters in this way, the resulting image will be more strongly filtered in areas that are not indicative of an edge, while the resulting image will be less strongly filtered in areas that are indicative of an edge.

It should also be appreciated that by using "down" and "up" dynamic ranges in place of a single dynamic range, and thus consequently using $\sigma_{COM}$ and $\sigma_{MAX}$ to filter the "down" and "up" directions separately, the resulting filtered image better preserves the low amplitude edges.

The image data filtering circuit 270, under control of the controller 210, then filters the color separation layers for the current pixel based on the filter parameters to be used as identified by the local filter parameter modifying circuit 250 and based on the color separation layers to be filtered as identified by the local image data analyzing circuit 240.

It should be appreciated that, in the above-outlined description of the palletized image enhancement system, once at least two of the color separation layers for a particular pixel are to be filtered, the other separation layers should be filtered regardless of their relation to the filter value $\sigma_{COM}$. However, it should be understood that instead of eliminating any relationship to the filter value $\sigma_{COM}$ for these other color separation layers, the requirements for filtering the other color separation layers could only be relaxed. Thus, in this case, if two of the color separation layers are within one $\sigma_{COM}$ of the current pixel, the other color separation layers would be filtered only if they are within a predefined value, such as, for example, twice $\sigma_{COM}$.

It should also be appreciated that, when the palletized image data is a GIF-type or a BMP-type palletized image, the color palette is part of the image data. Thus, in these types of images, the image data histogramming circuit 260 will not need to enable the color palette generator 262. Moreover, in this case, the image data histogramming circuit 260 does not need to see the actual image data.

Figure 4:
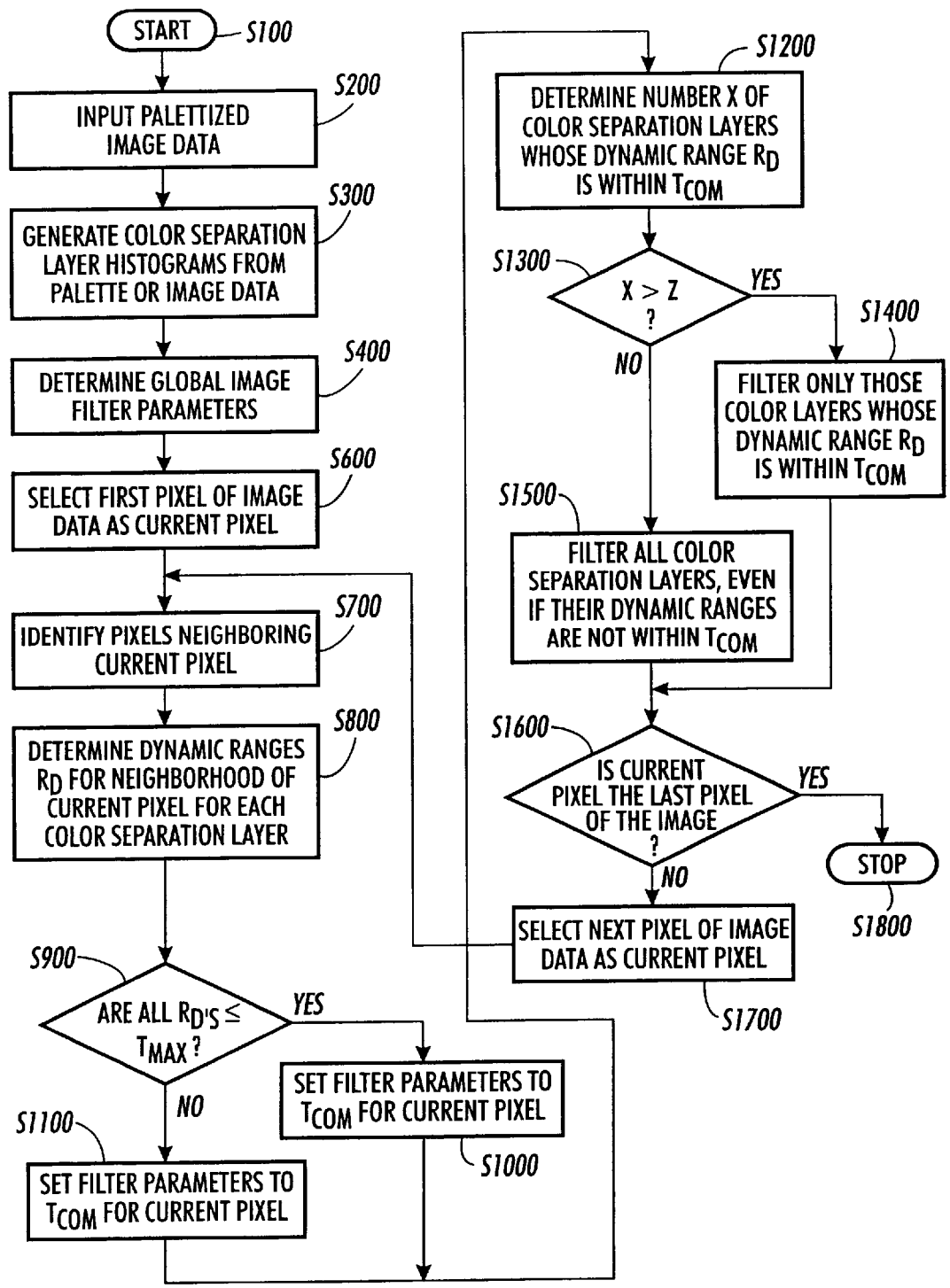
FIG. 4 is a flowchart outlining one exemplary embodiment of a method for enhancing palletized images according to this invention.

FIG. 4 is a flowchart outlining one exemplary embodiment of the method for enhancing palletized image data according to this invention. As shown in FIG. 4, the method begins in step S100, and continues to step S200. In step S200, the palletized image data is received. Then, in step S300, the color separation layer histograms are generated from the image data. In particular, if the image data contains an explicitly defined color palette, the color separation layer histograms are generated in step S300 from the color palette data. Control then continues to step S400.

In step S400, the global image filter parameters are determined by analyzing the color separation layer histograms generated in step S300. Then, in step S600, a first pixel of the image data is selected as a current pixel. Next, in step S700, neighboring pixels that neighbor the current pixel are identified. Then, in step S800, the single dynamic range $D_N$ is determined as the absolute difference of the image value of the current pixel with the image value of any pixel value in the predefined neighborhood. Alternatively, as described above in step S800, separate up and down dynamic ranges $D_{NU}$ and $D_{ND}$ can be determined. Control then continues to step S900.

In step S900, all of the dynamic ranges $D_N$, or $D_{NU}$ and $D_{ND}$, determined in step S800 are checked to see if they are less than the filter parameter $\sigma_{MAX}$ determined in step S400.

If so, control continues to step S1000. Otherwise, control jumps to step S1100. In step S1000, the filter parameters for the color separation layers are set to $\sigma_{MAX}$ for the current pixel. Control then jumps to step S1200.

In contrast, in step S1100, the filter parameters for each of the color separation layers for the current pixel are set to $\sigma_{COM}$. Control then continues to step S1200.

In step S1200, the number x of color separation layers whose dynamic range $D_N$, or dynamic ranges $D_{NU}$ and $D_{ND}$, is within the filter parameter $\sigma_{COM}$ is determined. Then, in step S1300, x is checked to determine if it is less than 2. If so, control continues to step S1400. Otherwise, control jumps to step S1500.

In step S1400, only those color separation layers whose dynamic range $D_N$, or dynamic ranges $D_N$, and $D_{ND}$, is within $\sigma_{COM}$ are filtered. Control then jumps to step S1600. In contrast, in step S1500, all of the color separation layers, even those having dynamic range $D_N$, or dynamic ranges $D_{NU}$ and $D_{ND}$, that are not within $\sigma_{COM}$, are filtered. Control then continues to step S1600.

In step S1600, the current pixel is checked to determine if it is the last pixel of the image. If it is not, control continues to step S1700. Otherwise, control jumps to step S1800.

In step S1700, the next pixel of the image data is selected as the current pixel. Control then returns to step S700.

In step S1800, the palletized image enhancement procedure ends. At this time, the enhanced palletized image data can be stored within the palletized image enhancement system 200 indefinitely until it is to be output over the signal line 310 to the image data sink 300, or can be output immediately.

Figure 5:
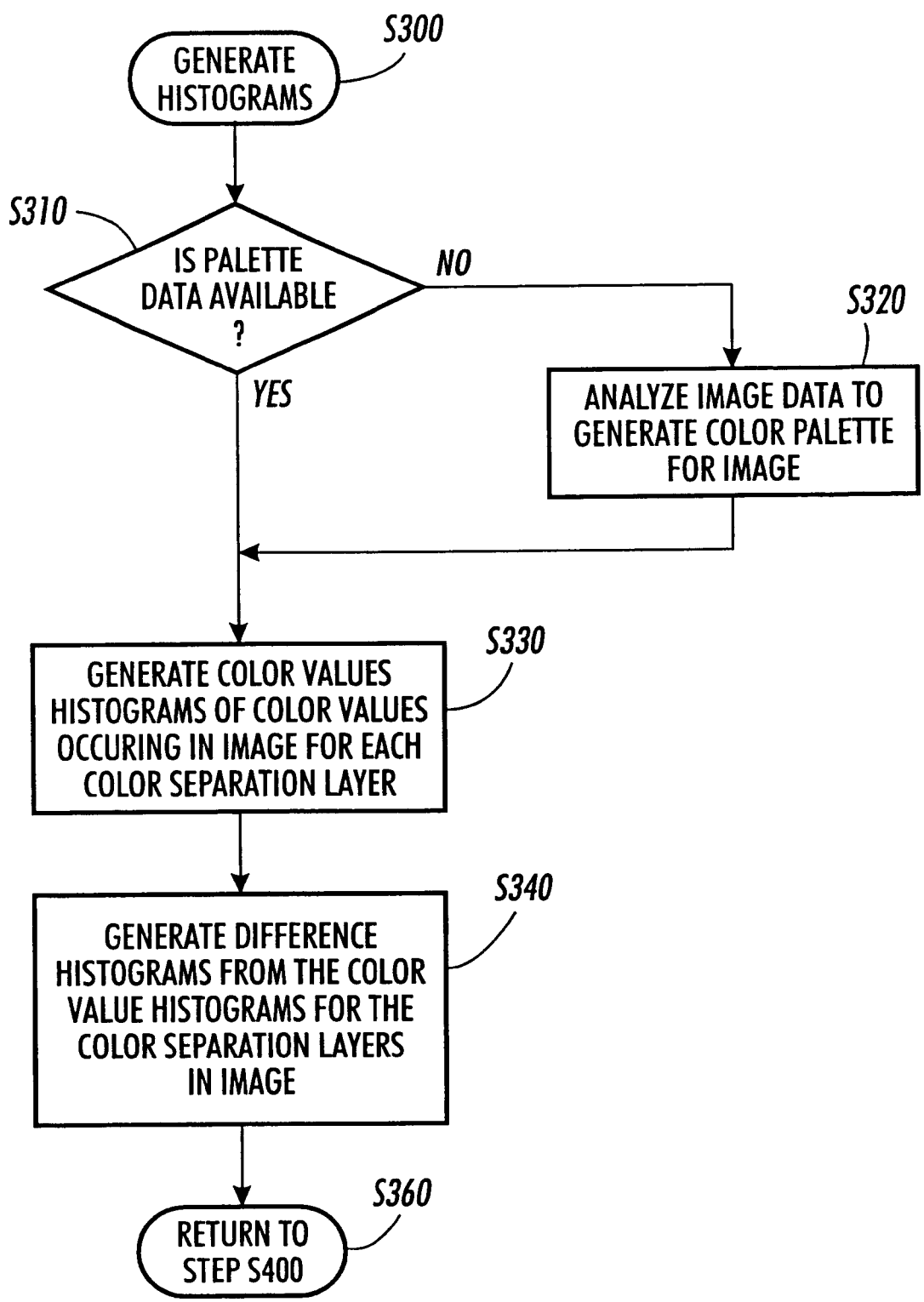
FIG. 5 is a flowchart outlining in greater detail one exemplary embodiment of the histogram generating step of FIG. 4.

FIG. 5 is a flowchart outlining in greater detail one exemplary embodiment of outlining the histogram generating step S300 of FIG. 4. Beginning in step S300, control continues to step S310. In step S310, the image data is analyzed to determine if the palette data is available. If the palette data is not available, control continues to step S320. Otherwise control jumps to step S330. In step S320, the image data is analyzed to generate the color palette for the image. Control then continues to step S330.

In step S330, the color values histograms for the color values occurring in the image data for each color separation layer are generated. Then, in step S340, the difference histograms for each of the color separation layers in the image are generated from the color value histograms generated in step S330. Control then continues to step S360, where control is returned to step S400 of FIG. 4.

Figure 6A:
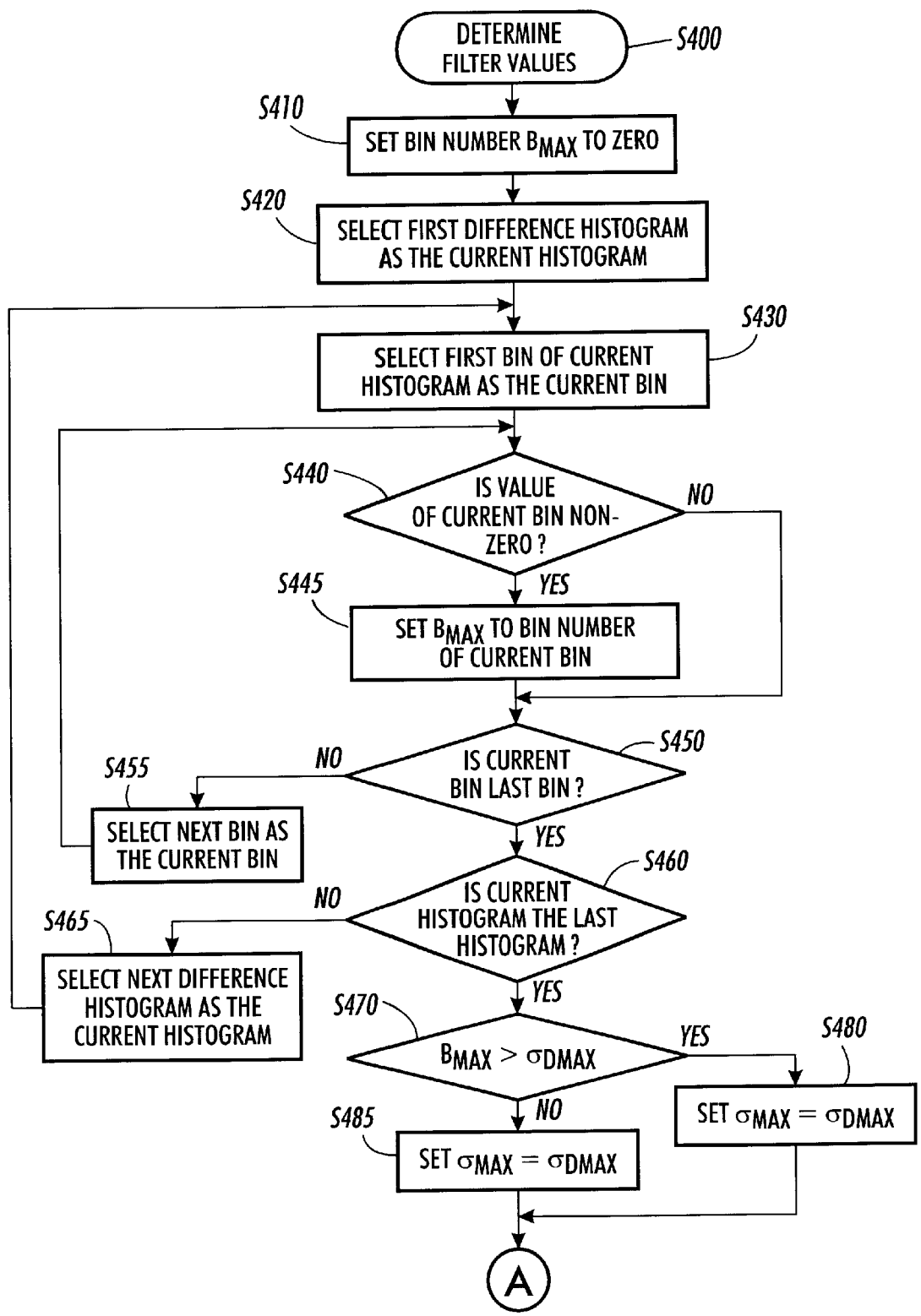
FIGS. 6A and 6B are a flowchart outlining in greater detail one exemplary embodiment of the filtered value determining step of FIG. 4.
Figure 6B:
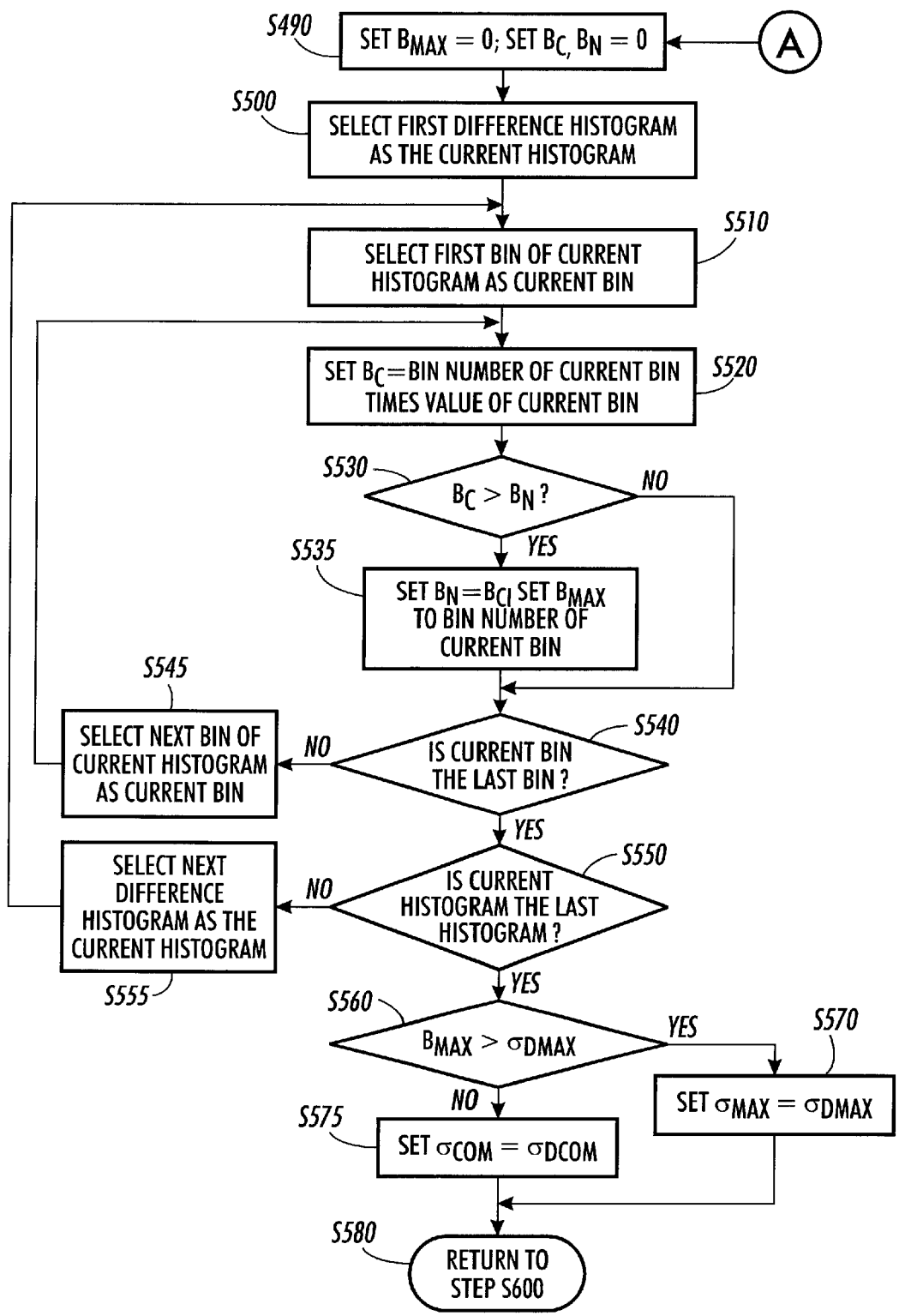

FIGS. 6A and 6B are a flowchart outlining in greater detail one exemplary embodiment of the filter value determining step S400 of FIG. 4. Beginning in step S400, control continues to step S410. In step S410, the bin number value indicating the bin number having the largest non-zero value is set to 0. Then, in step S420, the first difference histogram generated in step S300 is selected as the current histogram. Next, in step S430, the first bin of the current histogram is selected as the current bin. Control then continues to step S440.

In step S440, the value of the current bin is checked to determine if it is non-zero. If the value of the current bin is non-zero, control continues to step S445. Otherwise, control jumps directly to step S450. In step S445, the bin number value $B_{MAX}$ is set to the bin number of the current bin. Control then continues to step S450.

In step S450, the current bin is checked to determine if it is the last bin. If so, control jumps directly to step S460. Otherwise, control continues to step S455. In step S455, the next bin in the current histogram is selected as the current bin. Control then returns to step S440.

In step S460, the current histogram is checked to determine if it is the last difference histogram that needs to be checked. If so, control jumps directly to step S470. Otherwise control continues to step S465. In step S465, the next difference histogram is selected as the current histogram. Control then returns to step S430.

In step S470, the bin value $B_{MAX}$ indicating the bin number in all of the difference histograms having the largest non-zero value is checked to determine if it is greater than a default maximum value $\sigma_{DMAX}$. If so, control continues to step S480. Otherwise, control jumps to step S485. In step S480, the filter parameter $\sigma_{MAX}$ is set to the bin number value $B_{MAX}$. Otherwise, in step S485, the filter parameter $\sigma_{MAX}$ is set to the default value $\sigma_{DMAX}$. Control then continues from either step S480 or step S485 to step S490.

In step S490, the bin number value $B_{MAX}$ is reset to 0. At the sane time, two intermediate values $B_C$ and $B_N$ are also set to 0. Then, in step S500, the first difference histogram is selected as the current histogram. Next, in step S510, the first bin of the current histogram is selected as the current bin. Next, in step S520, the value $B_C$ is set equal to the bin number of the current bin weighted based on the occurrence value stored in the current bin. Control then continues to step S530. It should be appreciated that, as set forth above, one simple method for weighting the bin number of the current bin based on the occurrence value stored in the current bin comprises multiplying the bin number by the occurrence value, or, more generally, determining the first-order moments of the non-zero bins of the difference histogram. However, any other known or later developed weighting technique can equally be used.

In step S530, the result $B_C$ of weighting the current bin number based on the occurrence value for the current bin is compared to the maximum previous value $B_N$ of the result of weighting a previous bin number based on the occurrence value of that previous bin number. If $B_C$ is greater than $B_N$, control continues to step S535. Otherwise, control jumps directly to step S540. In step S535, $B_N$ is set to $B_C$ and the bin number value $B_{MAX}$ is set to the bin number of the current bin. Control then continues to step S540.

In step S540, the current bin is checked to determine if it is the last bin in the current histogram. If so, control jumps to step S550. Otherwise, control continues to step S545. In step S545, the next bin of the current histogram is selected as the current bin. Control then returns to step S520.

In step S550, the current histogram is checked to determine if it is the last histogram that needs to be analyzed. If so, control jumps to step S560. Otherwise, control continues to step S555. In step S555, the next difference histogram is selected as the current histogram. Control then returns to step S510.

In step S560, the bin number value $B_{MAX}$ is compared to a default common value $\sigma_{COM}$. If $B_{MAX}$ is greater than $\sigma_{DCOM}$, control continues to step S570. Otherwise, control jumps to step S575. In step S570, the common filter parameter $\sigma_{COM}$ is set to the bin number value $B_{MAX}$. Control then jumps to step S580. Otherwise, in step S575, the common filter parameter $\sigma_{COM}$ is set to the default value $\sigma_{DCOM}$. Control then continues to step S580.

In step S580, control returns to step S600.

Figure 7:
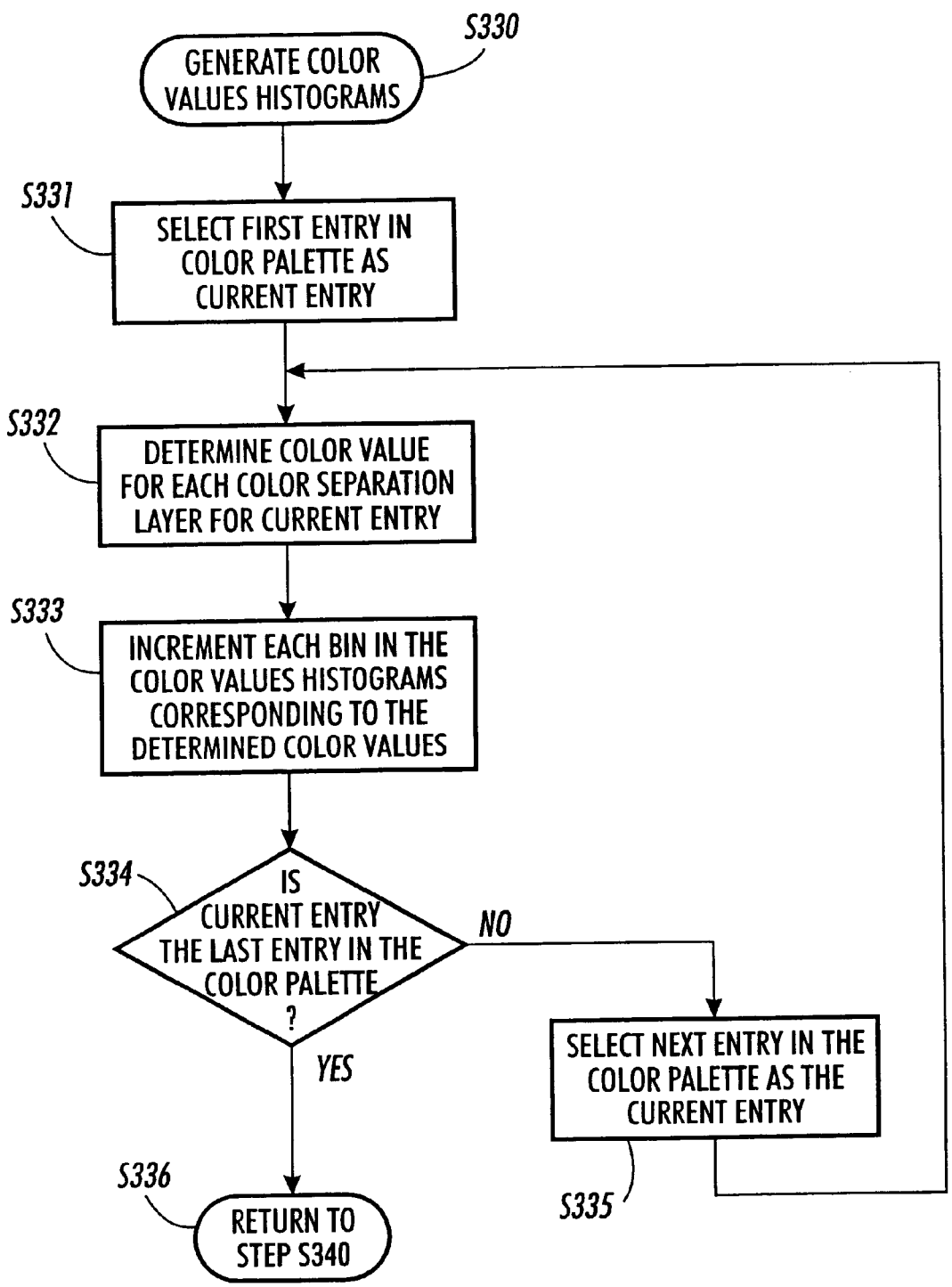
FIG. 7 is a flowchart outlining in greater detail one exemplary embodiment of the color value histogram generating step of FIG. 5.

FIG. 7 is a flowchart outlining in greater detail one exemplary embodiment of the color value histogram generating step S330 of FIG. 5. Beginning in step S330, control continues to step S331. In step S331, the first entry in the color palette is selected as the current entry. Then, in step S332, the color value for each color separation layer for the current entry is determined. Next, in step S333, the bins in the color values histograms corresponding to the determined color values for the color separation layers are incremented. Control then continues to step S334.

In step S334, the current palette entry is checked to determine if it is the last entry in the color palette. If so, control jumps to step S336. Otherwise, control continues to step S335.

In step S335, the next entry in the color palette is selected as the current entry. Control then returns to step S332. In step S336, control returns to step S340.

Figure 8:
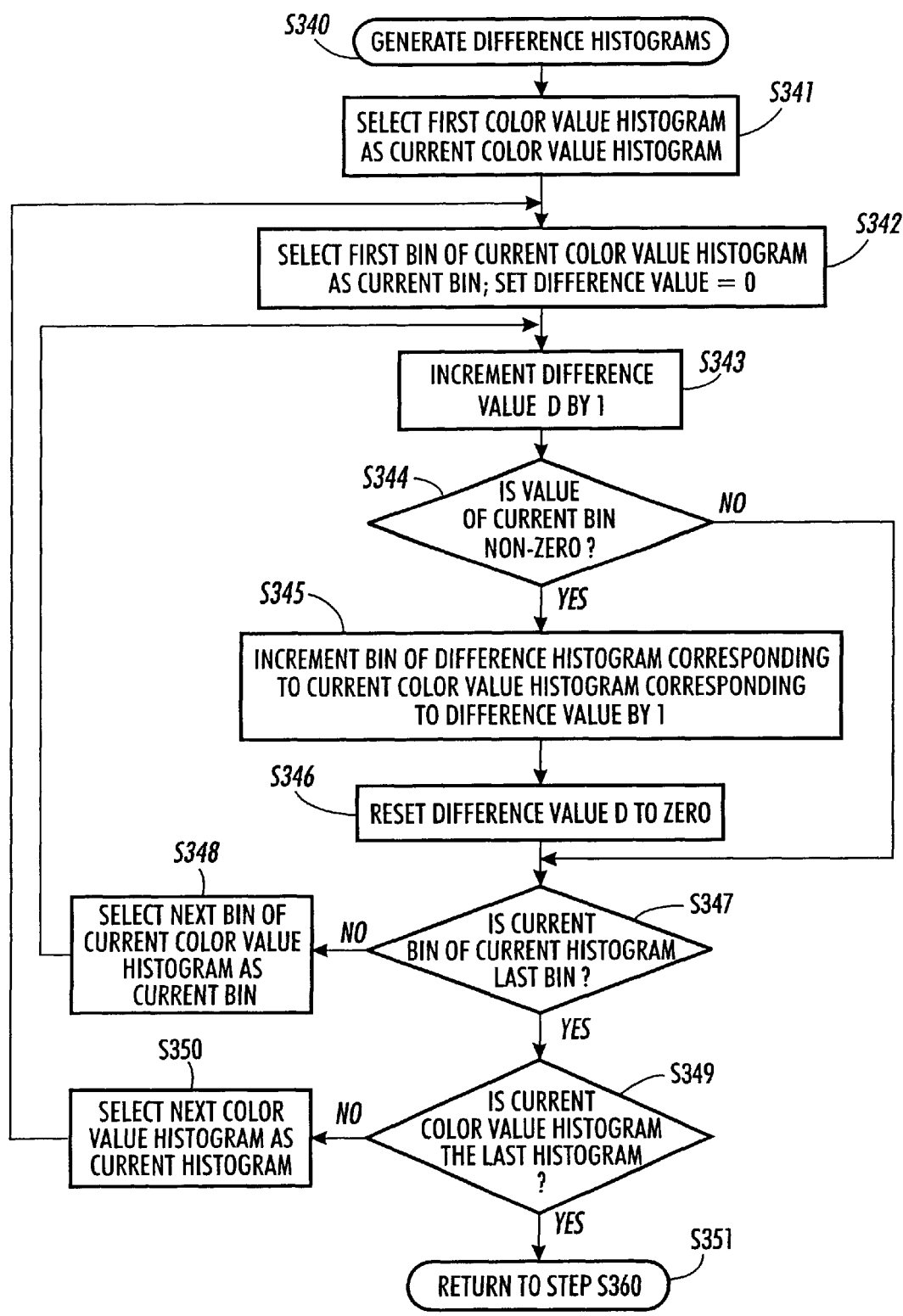
FIG. 8 is a flowchart outlining in greater detail one exemplary embodiment of the difference histogram generating step of FIG. 5.

FIG. 8 is a flowchart outlining in greater detail one exemplary embodiment of the different histogram generating step S340 of FIG. 5. Beginning in step S340, control continues to step S341. In step S341, the first color value histogram is selected as the current color value histogram. Then, in step S342, the first bin of the current color value histogram is selected as the current bin. At the same time, the difference value D is set to 0. Next, in step S340, the difference value D is incremented by 1. Control then continues to step S344.

In step S344, the value of the current bin is checked to determine if it is non-zero. If so, control continues to step S345. Otherwise, if the value of the current bin is zero, control jumps directly to step S347. In step S345, the bin corresponding to the difference value D of the difference histogram corresponding to the current color value histogram is incremented by 1. Next, in step S346, the difference value D is reset to 0. Control then continues to step S347.

In step S347, the current bin of the current histogram is checked to determine if it is the last bin of the current histogram. If so, control jumps to step S349. Otherwise, control continues to step S348. In step S348, the next bin of the current color value histogram is selected as the current bin. Control then returns to step S343.

In step S349, the current color value histogram is checked to determine if it is the last color value histogram that needs to be analyzed. If so, control jumps to step S351. Otherwise, control continues to step S350. In step S350, the next color value histogram is selected as the current color value histogram. Control then jumps back to step S342. In step S350, control is returned to step S360 of FIG. 5.

FIG. 9 outlines one exemplary color value histogram for an exemplary color separation layer. The numbers 0–255 on the left column of FIG. 9 are the color separation layer color values. In particular, each row in FIG. 9 contains 16 of the 256 different color values for this color separation layer that could appear in the color palette for a particular image. In the exemplary embodiment of the color value histogram shown in FIG. 9, the color value histogram records only whether a color value occurs in the palette, by setting the value of the bin for that color value to "1", and only the first time that that color value appears in the palette. However, no count is kept of the actual number of occurrences of each color in the palette. Additionally, there is at least one color on the color palette corresponding to this color value histogram that has a color value of "0" for this color separation layer.

FIG. 10 shows the distance histogram generated from the color value histogram shown in FIG. 9. In particular, the left-hand column indicates the separation distance values that occur between consecutive non-zero values in the color value histogram. It should be appreciated that, in the distance histograms, such as the one shown in FIG. 10, the maximum non-zero number will rarely be much higher than that shown in FIG. 10. In particular, FIG. 10 shows that there are 11 different non-zero separation values that occur between consecutive non-zero values in the color values histogram shown in FIG. 9.

The value in the 0 separation distance bin, i.e., the upper left-hand bin in FIG. 10, is non-zero because the 0 bin in the color values histogram shown in FIG. 9 is non-zero. That is, the distance value for the 0 bin in FIG. 9 relative to a previous bin is 0. The 1 bin in FIG. 10 is 60, indicating there are 60 occurrences in the color value histogram shown in FIG. 9 where a current non-zero-valued bin is immediately adjacent to the previous non-zero-valued bin. The value 21 in the 2-bin in FIG. 10 indicates there are 21 occurrences where a bin having a non-zero value is separated by one bin having a zero value from the previous non-zero-valued bin.

The non-zero values in the 3-bin, 4-bin, 5-bin, 6-bin, 7-bin, 11-bin, 12-bin and 44-bin all indicate that these separation distances occur in the color value histogram shown in FIG. 9. In particular, the value 1 in the 44-bin of the distance histogram shown in FIG. 10 represents the separation between the non-zero value in the 211-bin in the color value histogram shown in FIG. 9 and the next non-zero value, which occurs in the 255-bin.

Figure 11:
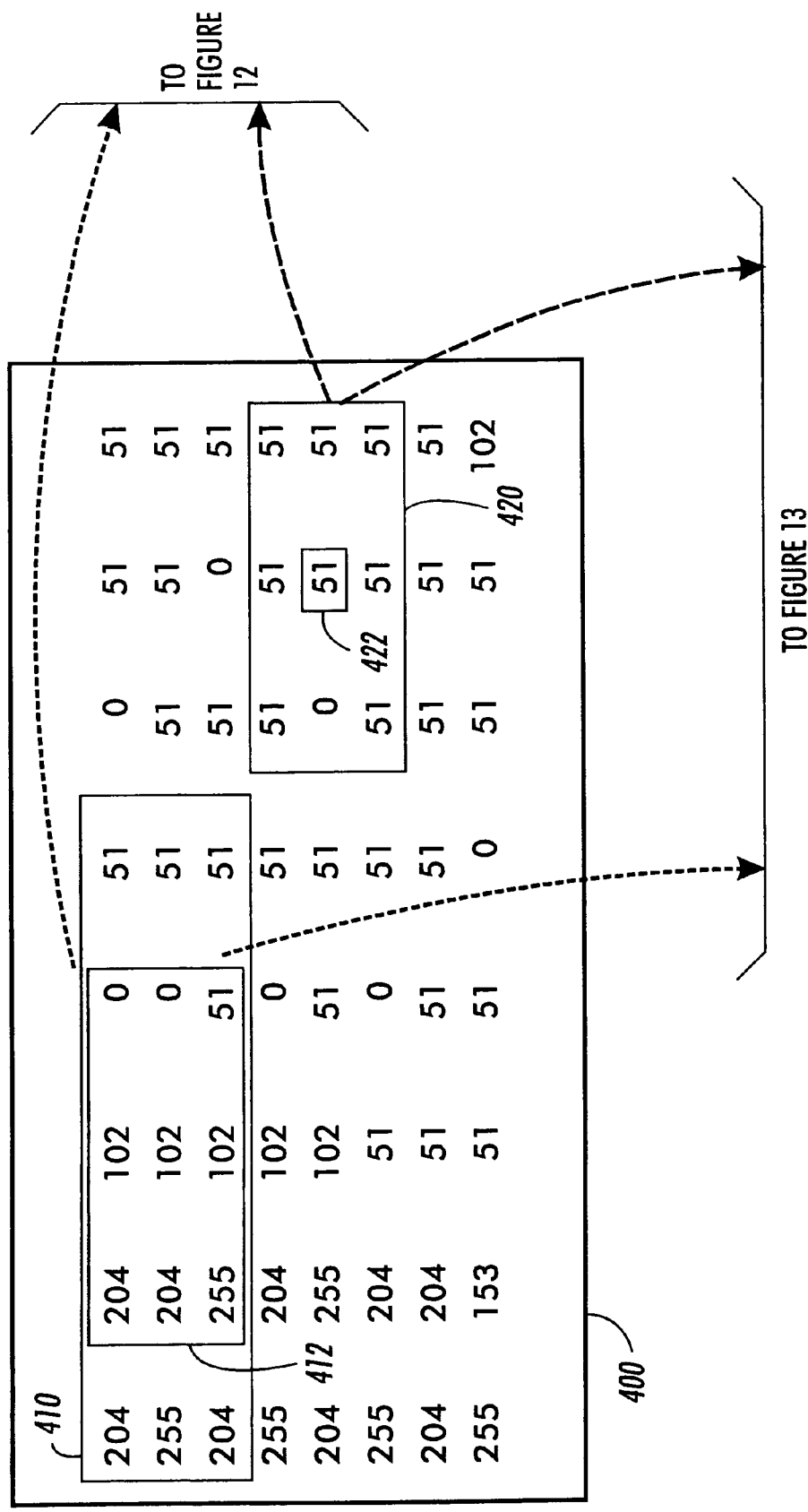
FIG. 11 is an exemplary portion of one color separation layer of a palletized image.

FIG. 11 shows one color separation layer for an exemplary palletized image. Applying the color separation layer histogram generating step S300 and the global image filter parameter determining step S400 outlined above to the color separation layer of the image shown in FIG. 11, $\sigma_{COM}$ and $\sigma_{MAX}$ are both equal to 51. In the color separation layer 400, two regions, a first region 410 and a second region 420 are identified.

Figure 12:
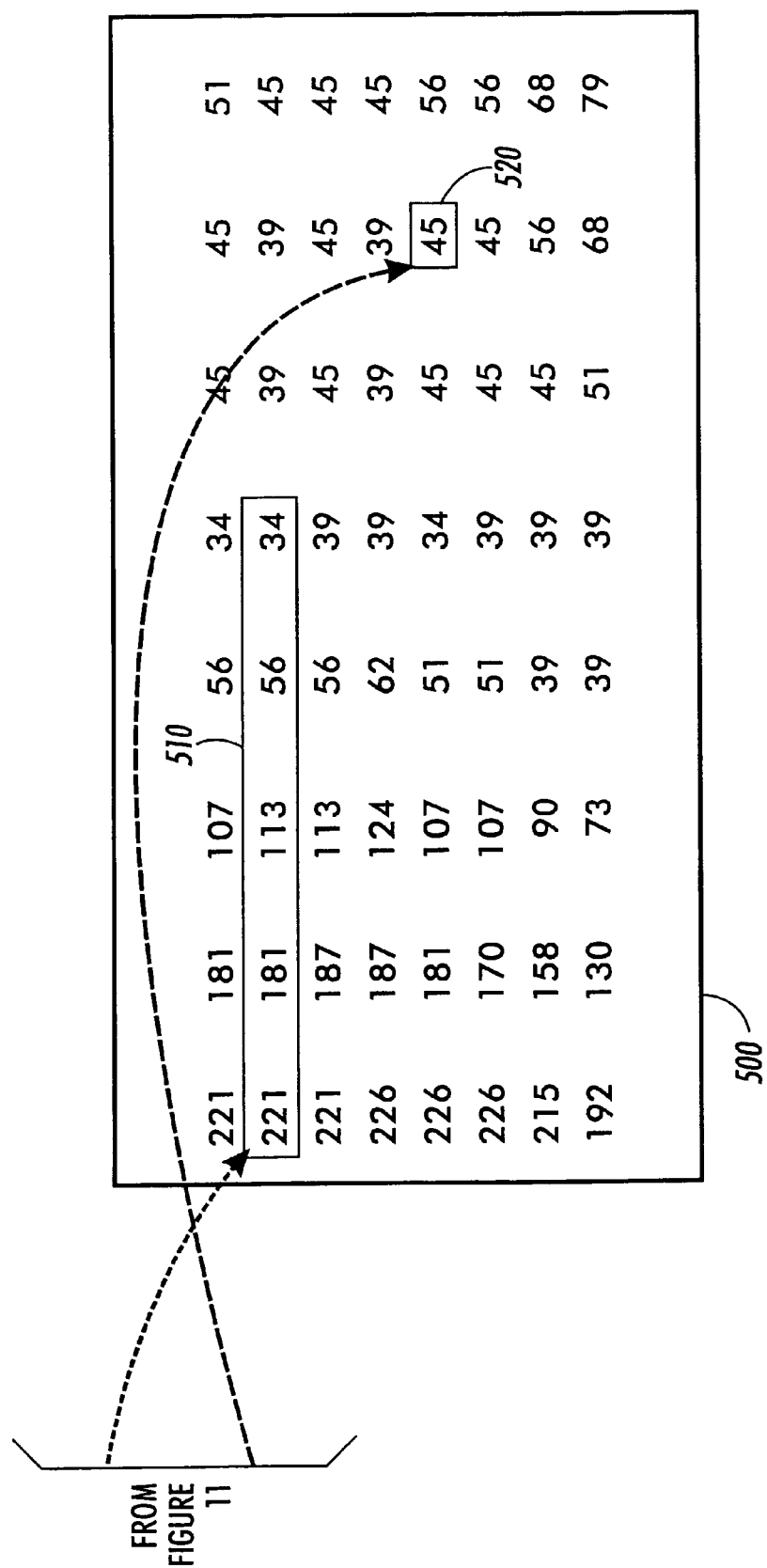
FIG. 12 shows the exemplary portion of the color separation layer shown in FIG. 11 filtered using conventional techniques.

FIG. 12 shows a conventionally-filtered color separation layer 500 that is generated from the original color separation layer 400 shown in FIG. 11 by averaging a 3×3 neighborhood of pixels neighboring each of the pixels of the image. The filtered image 500 was generated using a conventional low pass filtering process that averages the nine pixels in the 3×3 neighborhood around each pixel. The box 520 in FIG. 12 indicates the image value of the center pixel 422 of the box 420 is converted from an image value for this color separation layer of 51 to an image value of 45. This value is determined by summing the pixel values in the box 420 and dividing that value by 9.

FIG. 13 shows a filtered version 600 of the color separation layer 400 shown in FIG. 11 filtered according to this invention. As shown in FIG. 13, the pixel in the box 620 is also filtered to a value of 45. This value is obtained because all of the neighbors to the center pixel in the box 420 are within the value $\sigma_{MAX}$ of the pixel value of the center pixel in the box 420.

In contrast, filtering the pixel values in the box 410 using conventional averaging, as shown in the box 510 in FIG. 12, and filtering according to this invention, as shown in the box 610 in FIG. 13, results in significantly different image values. In particular, the pixel values in the box 410 represent an edge area. In the box 510 of FIG. 12, which was generated using conventional averaging, the edge width of the edge, represented by the box 412 in FIG. 11, becomes an edge with an edge width of 5, as shown by the box 510 of FIG. 12. That is, using conventional averaging, the width of the edge is blurred in FIG. 12 from three pixels to five pixels.

In contrast, as shown in the box 610 in FIG. 13, using the palletized image enhancement methods and systems of this invention, the edge width of the edge 412 is maintained at three pixels wide. Accordingly, as shown in FIGS. 11–13, the palletized image enhancing methods and systems of this invention provides good smoothing in some areas, such as the box 620, while maintaining sharp edges in edge areas, as shown in the box 610.

FIG. 14 shows a pseudo-code listing for enhancing palletized red-green (RGB) images. As shown in FIG. 14, in a first portion of the pseudo-code, a variable labeled "sigma_common" is determined as the maximum of one of three values. These three values are the maximum product of the red histogram difference value times the occurrence of that value, the maximum of the green difference values times the number of occurrences of that value and the maximum of the blue difference values times the occurrences of that value. The second portion of the pseudo-code listing indicates that if the determined value for the variable "sigma_common" is less than the value of a predefined variable "sigma_common_default", sigma_common is set to be equal to sigma_common default.

The next portion of the pseudo-code indicates that the variable "sigma_max" is determined as the maximum value of three values. These three values are the maximum non-zero red difference value, the maximum non-zero green difference value and the maximum non-zero blue difference value. The next portion of the pseudo-code listing indicates that if the value for the variable "sigma_max" is less than the predetermined value for the variable "sigma_max_default", then the variable "sigma_max" is set equal to the variable "sigma_max_default".

The final portion of the pseudo-code applies the filter values determined previously to filter 3×3 neighborhoods of pixels for each pixel of the image. In particular, if the dynamic range of the neighborhood is less than the variable "sigma_max", then the 3×3 neighborhood is filtered with the value of the variable "sigma_max". Otherwise, the 3×3 neighborhood is filtered with the value of the variable "sigma_common". Finally, if two of the separations have a value of less than or equal to the value of the variable "sigma_common", then the third one of the red, green or blue separation layers is also filtered.

The effect of these two modifications should be appreciated. First, the filter value $\sigma_{COM}$ represents the "most probable difference" and, to maintain sharpness, underestimates the noise generated by palletizing the image. That is, the most probable difference $\sigma_{COM}$ is often below the actual quantization noise level of a particular neighborhood in the image. The first modification according to this invention, as applied by the local filter parameters modifying circuit 250 and represented in steps S1300–1500 of FIG. 4 and the last portion of FIG. 14, alleviates this by determining if two or more of the color separation layers of an individual pixel are within the most probable difference $\sigma_{COM}$. If that is the case, the other color separation layers are also filtered even if they are outside of the most probable difference $\sigma_{COM}$.

Second, for neighborhoods that are entirely within the noise level, meaning there is no reliable edge or detail information in the neighborhood, the filter parameter is switched to the maximum difference $\sigma_{MAX}$. This results in a stronger smoothing operation being applied to the palletized image data. This is one feature provided by the local image data analyzing circuit 240 and is represented in the method at steps S900–1100 of FIG. 4 and in the next to last portion of the pseudo-code shown in FIG. 14.

It should be appreciated that the systems and methods of this invention can be implemented in a variety of known devices, such as laser printers, ink jet printers, digital copiers, graphics boards, and the like.

As shown in FIGS. 1–3, the palletized image enhancing system 100 of this invention is preferably implemented on a programmed general purpose computer. However, the palletized image enhancing system 200 of this invention can also be implemented on a special purpose computer, a programmed microprocessor or microcontroller and peripheral integrated circuit elements and ASIC or other integrated circuit, a digital signal processor, a hard wired electronic or logic circuit such as a discrete element circuit, a programmable logic device such as a PLD, PLA, FPGA, or PAL, or the like. In general, any device, capable of implementing a finite state machine that is in turn capable of implementing the flowcharts shown in FIGS. 4–8, can be used to implement the palletized image enhancing system 200 of this invention.

While this invention has been described in conjunction with the specific embodiments outlined above, it is evident that many alternatives, modifications and variations will be apparent to those skilled in the art. Accordingly, the preferred embodiments in the invention, as set forth above, are intended to be illustrative, not limiting. Various changes may be made without departing from the spirit and scope of the invention.

What is claimed is:

1. A method for enhancing colors in a palletized image, comprising:

inputting a palletized color image, the palletized color image having a plurality of pixels arranged in at least a two-dimensional array;

generating a plurality of histograms from a color palette of the input palletized color image; and determining a plurality of filter parameters based on the plurality of histograms.

2. The method of claim 1, wherein generating the plurality of histograms comprises:

generating a plurality of color value histograms from the color palette; and generating a plurality of difference histograms from the plurality of color value histograms.

3. The method of claim 2, wherein generating the plurality of color value histograms comprises:

separating each entry in the color palette into a plurality of color values, each color value corresponding to a separate color separation layer of the palletized color image determining, for each of the separate color separation layers, a color value histogram for that separate color separation layer based on the color values corresponding to that color separation layer.

4. The method of claim 2, wherein generating the plurality of difference histograms comprises:

determining, for each color value histogram, separation distances within that color value histogram between adjacent non-zero values of that color value histogram; and determining, for each color value histogram, a difference histogram of the separation distances within that color value histogram.

5. The method of claim 2, further comprising:

determining whether the palletized color image includes an color palette portion; and when the palletized color image does not include a color palette portion, generating the color palette from image data of the palletized color image.

6. The method of claim 2, wherein determining the plurality of filter parameters comprises:

determining at least one common filter value from the plurality of difference histograms; and determining at least one maximum filter value from the plurality of difference histograms.

7. The method of claim 6, wherein determining the at least one maximum filter value comprises:

determining, for each difference histogram, which bins have non-zero values; and determining a highest bin number of the bins in the plurality of difference histograms having non-zero values.

8. The method of claim 7, wherein determining the at least one maximum filter value further comprises:

determining if the determined highest bin number is greater than a default maximum filter value;

setting, when the determined highest bin number is greater than the default maximum filter value, the maximum filter value to the determined highest bin number; and setting, when the determined highest bin number is not greater than the default maximum filter value, the maximum filter value to the default maximum filter value.

9. The method of claim 6, wherein determining the at least one maximum filter value comprises determining a maximum filter value for each color separation layer, comprising:

determining, for each color separation layer, which bins have non-zero values; and determining, for each color separation layer, a highest bin number of the bins having non-zero values in the difference histogram corresponding to that color separation layer.

10. The method of claim 9, wherein determining the maximum filter value for a color separation layer further comprises:

determining, for the determined highest bin number of the corresponding difference histogram, if that determined highest bin number is greater than a default maximum filter value;

setting, when that determined highest bin number is greater than the default maximum filter value, the maximum filter value for that color separation layer to that determined highest bin number; and setting, when that determined highest bin number is not greater than the default maximum filter value, the maximum filter value for that color separation layer to the default maximum filter value.

11. The method of claim 6, wherein determining the at least one common filter value comprises:

weighting, for each difference histogram and each bin having a non-zero value in that difference histogram, the bin number of that bin based on the value in that bin to obtain a weighted value for each such bin; and determining the bin number of the bin, of the bins in the plurality of difference histograms having non-zero values, that has a highest weighted value.

12. The method of claim 11, wherein determining the at least one common filter value further comprises:

determining if the determined bin number is greater than a default common filter value;

setting, when the determined highest bin number is greater than the default common filter value, the common filter value to the determined highest bin number; and setting, when the determined highest bin number is not greater than the default common filter value, the common filter value to the default common filter value.

13. The method of claim 11, wherein the weighting the bin number based on the bin value comprises multiplying the bin number by the bin value.

14. The method of claim 6, wherein determining the at least one common filter value comprises determining a common filter value for each color separation layer, comprising:

weighting, for each difference histogram and each bin having a non-zero value in that difference histogram, the bin number of that bin based on the value in that bin to obtain a weighted value for each such bin; and determining, for each color separation layer, the bin number of the bin, of the bins having non-zero values in the difference histogram corresponding to that color separation layer, that has a highest weighted value.

15. The method of claim 14, wherein determining the common filter value for a color separation layer further comprises:

determining, for the determined bin number of the corresponding difference histogram, if that determined bin number is greater than a default common filter value;

setting, when the determined bin number is greater than the default common filter value, the maximum filter value for that color separation layer to that determined bin number; and setting, when that determined bin number is not greater than the default common filter value, the commn filter value for that color separation layer to the default common filter value.

16. The method of claim 1, further comprising:

determining, for each pixel, a number of neighboring pixels based on a predetermined pixel neighborhood;

determining, for each color separation layer in the palletized color image, at least one of a minimum color value and a maximum color value of the determined neighboring pixels for that pixel;

determining, for each color separation layer, at least one difference between the color value for that pixel and the determined ones of the minimum and maximum color values for that pixel;

comparing, for each color separation layer, the at least one determined difference to a first one of the plurality of filter parameters; and selecting, for each color separation layer, one of the plurality of filter parameters based on the comparison.

17. The method of claim 16, wherein selecting, for each color separation layer, one of the plurality of filter parameters based on the comparison comprises:

selecting, for that color separation layer, the first filter parameter when the at least one determined difference is not greater than the first filter parameter, the first filter parameter providing greater smoothing; and selecting, for that color separation layer, a second filter parameter when at least one of the at least one determined difference is greater that the first filter parameter, the second filter parameter providing greater edge sharpness.

18. The method of claim 16, further comprising filtering each color separation layer for that pixel based on the selected filter parameter for that color separation layer.

19. The method of claim 16, further comprising:

determining, for each color separation layer, whether that color separation layer is within a second one of the plurality of filter parameters; and determining a number of color separation layers that are within the second filter parameter; and filtering each color separation layer for that pixel based on the determined number of color separation layers that are within the second filter parameter.

20. The method of claim 19, wherein filtering each color separation layer, based on the determined number of color separation layers comprises:

filtering all of the color separation layers when the determined number of color separation layers is greater than a predetermined number; and filtering only those color separation layers that are within the second filter parameter when the determined number is not greater than the predetermined number.

21. The method of claim 20, wherein the predetermined number is determined based on a number of color separation layers in the palletized color image.

22. The method of claim 21, wherein, when the number of color separations layers is three or four, the predetermined number is two.

23. A palletized image enhancement system, comprising:
   a histogram generating circuit;
   a filter parameter determining circuit that determines a plurality of filter parameters based on a plurality of histograms generated by the histogram generating circuit; and
   a palletized color image filtering circuit.

24. The palletized image enhancement system of claim 23, wherein the histogram generating circuit comprises:
   a color value histogram generating circuit; and
   a difference histogram generating circuit.

25. The palletized image enhancement system of claim 24, wherein the histogram generating circuit further comprises a color palette generating circuit.

26. The palletized image enhancement system of claim 23, wherein the filter parameter determining circuit comprises:
   a bin value analyzing circuit; and
   a maximum filter parameter determining circuit.

27. The palletized image enhancement system of claim 23, wherein the filter parameter determining circuit comprises:
   a bin value multiplying circuit; and
   a common filter parameter determining circuit.

28. The palletized image enhancement system of claim 23, further comprising:
   a local image data analyzing circuit; and
   a local filter parameter modifying circuit.

* * * * *